Sept. 4, 1973 S. A. DENMAN 3,756,881

METHOD OF COUPLING ARTICLES OF UNLIKE MATERIALS

Original Filed Jan. 18, 1966 2 Sheets-Sheet 1

INVENTOR.
STEPHEN A. DENMAN
BY Jerome P. Bloom
ATTORNEY

METHOD OF COUPLING ARTICLES OF UNLIKE MATERIALS

Original Filed Jan. 18, 1966 2 Sheets-Sheet 2

INVENTOR
STEPHEN A. DENMAN
BY Jerome P. Bloom
ATTORNEY

United States Patent Office 3,756,881
Patented Sept. 4, 1973

3,756,881
METHOD OF COUPLING ARTICLES OF UNLIKE MATERIALS

Stephen A. Denman, 3030 E. Dorothy Lane, Apt. 24, Dayton, Ohio 45420

Original applications Jan. 18, 1966, Ser. No. 536,242, and May 6, 1969, Ser. No. 825,122, both now abandoned. Divided and this application Jan. 11, 1971, Ser. No. 105,553
Int. Cl. B32b *31/26;* H05b *3/54, 3/64*
U.S. Cl. 156—108 9 Claims

ABSTRACT OF THE DISCLOSURE

The disclosed method is advantageous for coupling glass to metal parts and particularly so for creating improved window or windshield installations. The method utilizes, as a bonding element, an elongate thermo-plastic or equivalent strip material so structured to provide that on application thereto of heat in the range from about 300° to about 500° F. that the surface and only the surface thereof becomes fluidly adhesive and particularly adapted thereby to quickly form a ready bond and a clean seal between glass and/or metal parts. While under the application of heat, in the range specified, the surface of the strip becomes fluidly adhesive, the inner portion of the body thereof retains an essentially stable form, though modified to a condition to enable said strip to accommodate and plastically conform to the contour of an applied load. In practice of the disclosed method, the strip is mounted to one of the unlike parts to be coupled and has placed thereagainst surface portions of the other part. While in such position, the strip material is heated to achieve a temperature from about 300° to about 500° F. to cause only the surface thereof to become fluidly adhesive, whereupon there is a quick and clean adhesive contact between the strip and the contacting portions of the relatively abutted dissimilar parts. On cooling in place, the strip provides a uniquely complete and extremely strong bond and seal between the parts.

This application is a division of applicant's prior copending applications for U.S. Letters Patent Ser. Nos. 536,-242 and 825,122, respectively filed Jan. 18, 1966 and May 6, 1969 for "Coupling Device" both abandoned.

BACKGROUND OF THE INVENTION

This invention relates to a unique method for coupling glass and/or metal parts. It has proven to have particular advantage in the automotive industry, with reference to installation of windshields. The invention will be therefore described in this respect, though its application is obviously not so limited and such is not intended. For example, the invention method is admirably suited for use in creating window or like units.

The prior art has evidenced many, many problems in respect to installations involving the connection of glass and metal parts and particularly between glass and metal parts. For example, with respect to the automotive industry, with past and existing practice and materials it has proven to be a difficult and arduous task to install a windshield or like structure in the provided metal frame. The difficulties have stemmed from several sources. In the first instance it has been found there must be extreme care in handling windshields, particularly in a production operation, to avoid damage. The problem in this respect has been compounded since the frames or openings for such items are usually less than precision formed. For such reasons, as well as others, the automotive companies have found there is considerable time consumed in setup and adjustment of windshields in the process of their application. This all is compounded by the fact the heretofore known plastic sealing materials commonly employed for the purposes described are either so messy to handle that there is a large amount of time and money consumed in cleanup or the glass windshield must be applied in such a manner and under such pressure as to invite damage. As a matter of fact in this respect damage has proven to be quite frequent.

That in the prior art there has been no proper solution to the problems above posed is well evidenced by the fact that different automotive companies use different materials and systems for installing windshields.

For example, one motor company uses a cold adhesive tape to line an opening, following which a windshield is forecd against the tape under the influence of a substantial hydraulic force. The objective is to cold flow the tape and produce thereby a bond between the tape, the windshield and the framing structure. This has been the ultimate of the prior art as far as this motor company has been concerned. However, this motor company's practice produces many cracked windshields in their production line. Moreover, in any event, the pressures involved invariably produce residual strains in the glass structure and in many cases cracking occurs later. Further, technical information that has been uncovered indicates that with the prior art material and process utilized by said motor company the initial adhesion between the windshield and the automobile body is relatively low. This is inherent since the requirements of the adhesive tape employed dictates that the incorporated plasticizers and tackifiers be locked in to prevent sag or flow of the tape when subjected to elevated environmental temperatures so that no surface wetting can occur. Resultingly, where there is an occurrence of maximum mismatch of body and windshield, in application of the windshield, after compression is relieved, its rebound causes a break in the bond line between the tape and the related structure, at the point or points of minimum compression. Since initial adhesion is relatively low, in time the gap in the bond line grows and leaks occur. Where sufficiently high pressure is used to overcome this fault, stress cracks can readily result.

In contrast to the aforementioned procedure, another large automotive concern utilizes a relatively messy mastic material for bonding windshields rather than a cold flowed tape. This mastic resembles a soft caulking compound. In use, it is extruded and applied around the frame for the windshield in a bead form. Due to its ready flow condition it is necessary to interpose spacer blocks to contain successive sections of the mastic bead. Following the application of this bead, it must not be cured before the windshield is set in place. If the cure is too fast the mastic passes the point of usage and must be replaced. In some instances it takes much too long for the bead material to set and in such case the application and seal of the windshield is faulty. In any case, the mastic is messy on application of the windshield and it tends to flow in a manner to contaminate adjacent structural areas. This necessitates much cleaning and therefore this process entails extra labor and expense.

The prior art has various teachings in reference to methods for coupling parts. For example, Wilkins U.S. Letters Pat. 3,049, 465 teaches the connection of elements of thermo-plastic by fusing the same using a compatible thermo-plastic tape. Of course, as will be self-evident from inspection of this patent, the problems presented in such a case are extremely different from those where one is concerned with coupling metal and/or glass parts and, in particular, parts of different material. In dealing with dissimilar materials fusion is not possible in the sense of the Wilkins concept. Thus, Wilkins neither comprehends the problems faced by the present invention or the solution of the same which has evolved. Further, in the prior art, U.S. Letters Patent to Flaherty 3,263,268 teaches the heating of the thermo-setting resin to melt the same and produce a flow of fluid adhesive between parts. While the teaching of Flaherty may have some merit, it has not led to any improvement beneficial in the area of present concern and certainly does not achieve the benefits of the present invention. The aforementioned particles which are prevalent in applying windshields in the automotive industry are the best evidence in this respect.

DESCRIPTION OF THE INVENTION

With the aforementioned in mind, it must be understood therefore that the present invention relates to improvements in methods for the joining together of parts more particularly glass and metal parts. It will be described herein in particular reference to its significant advantage in applying windshields in automotive vehicles and comparable applications. As will be seen, the invention method provides in any case a simple but effective procedure for quickly, cleanly and efficiently attaching a glass object to a supporting structure. Moreover, the invention method enables the making of sealed windshield, window and like units of unexpected strength.

It will be self evident that the use of the invention method requires no special training or skill. It avoids the requirement for application of high pressures to fragile elements, the special equipment normally necessary for such and the consequent potential damage that such will involve. Moreover, it eliminates the need for use of messy, mastic materials which are difficult to handle and avoids substantial cleanup problems and expense in production procedures.

In the preferred practice of the invention, as here illustrated, the method employed utilizes an elongate stable but flexible thermo-plastic strip embodying a wire core. The strip is so structured that with the application of heat thereto, in the range of about 300° to 500° F., its surface and only its surface becomes fluidly adhesive while the balance thereof remains in an essentially stable form though modified to a condition to accommodate and plastically deform under compression. As will become clear, the invention procedure entails the placement of the strip between and in abutting relation to opposed portions of parts to be bonded together, whereupon heat may be applied to raise the temperature of the strip to the required level, as a result of which the surface of the strip is responsively converted to a fluid adhesive form. This produces a contact adhesion between the strip and the abutted parts and on leaving the same to cool in place there is produced between such parts, even where they are of dissimilar materials, such as metal and glass, an extremely strong and leakproof bond. As will be self-evident, the characteristic result of the use of the invention method to apply an automotive windshield is a quick, clean application of the windshield at a minimal cost.

It is therefore a primary object of the invention to provide an improved and simplified method for the coupling or bonding together of parts, particularly parts of unlike material, which is economical to employ, more efficient and satisfactory in use, adaptable to a wide variety of applications and unlikely to produce undesirable results.

Another object of the invention is to provide a method of bonding parts of different materials enabling cleanliness, speed and ease of application.

A further object of the invention is to provide an economical method for producing an improved window, windshield or like unit.

An additional object of the invention is to provide an improved method of applying a windshield or window object in frame structures of unlike material having a particularly advantageous application to the automotive industry.

Another object of the invention is to provide a method of applying glass or like parts to frames of different material possessing the advantageous features, the inherent meritorious characteristics and the capabilities herein described.

With the above and other incidental objects in view as will more fully appear in the specification, the invention intended to be protected by Letters Patent consists of the process, the parts and extensions thereof and the mode of their application as hereinafter described or illustrated in the accompanying drawings, or their equivalents.

DESCRIPTION OF A PREFERRED UTILIZATION OF THE INVENTION

Referring to the drawings.

Figure 1:
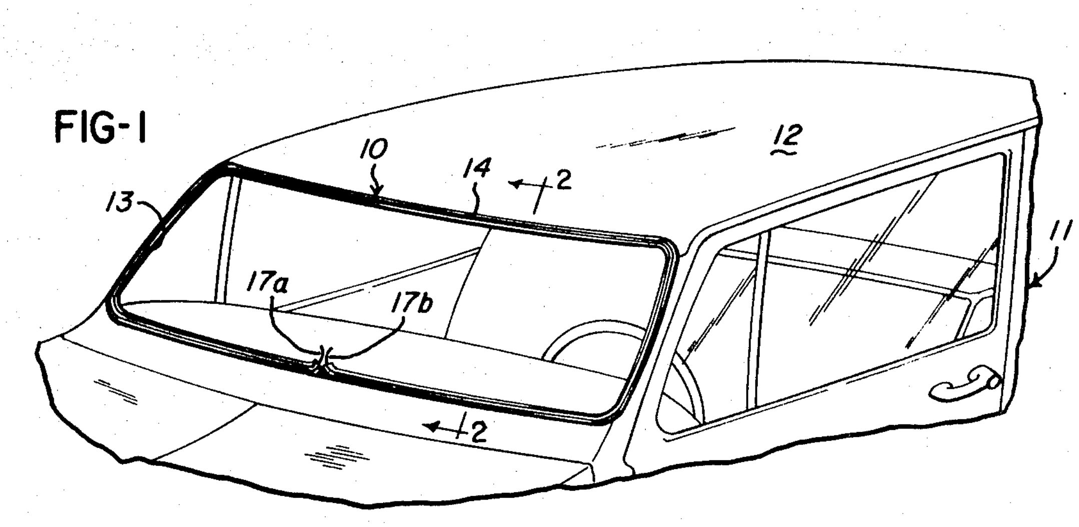
FIG. 1 is a fragmentary view, in perspective, illustrating the installation of a windshield as achieved by the invention method.

FIGS. 7 through 11 of the drawings show preferred forms of the core to be utilized in the coupling device employed in the practice of the invention as illustrated in FIGS. 1 through 5.

Like parts are indicated by similar numerals of reference throughout the drawings.

For an understanding of the method of the invention, it is essential that the elements to be employed in the practice thereof are fully understood. Accordingly, in the first instance reference is made to the accompanying drawings wherein the illustrations in FIGS. 1 through 5 reveal a coupling device in strip form having the characteristics required for the practice of the invention method. This strip is mainly composed of a body 10 of thermo-plastic the material of which is stable but when subjected to a predetermined amount of heat it may be plastically deformed under compression and the surface thereof becomes fluidly adhesive. This body is preferably formed of a thermo-plastic but may be of a thermo-setting compound of characteristics equivalent to that here described. For example, for the body 10 one may use natural and synthetic rubber or rubber resin compounds, polymers such as polyamides, polyesters, polysulfides, polyurethanes and epoxies, vinyls and other temperature sensitive means. However, the optimal materials for use in the practice of the present invention have been found to be modified butyl and ethylene-propylene synthetic rubbers which have a softening temperature range of about 300 to 500° F. For this reason any substitute materials employed should have generally equivalent physical characteristics. It is required that when subjected to a range of temperature from about 300 to 500° F. the surface and only the surface of the strip becomes fluidly adhesive while the balance remains in an essentially stable form though modified to a condition it will accommodate and plastically deform to adapt to the contour of an applied load.

There is thus basically required for the practice of the invention, with reference to the body of the coupling element to be employed, that in the prescribed temperature range of about 300° to 500° F. there is a differentiation in the physical characteristics of surface portions of the body on the one and and interior portions of the body on the other. This invention disclosure utilizes the foregoing physical concept of a coupling element, which concept can be applied by various means to any one of a large number of thermo-plastic materials or their equivalents to achieve the structure above defined. With the noted concept before them, fabricating personnel can create the mix to meet the limitations prescribed. To illustrate, but not limit, for example the thermo-plastic mix need only involve proper choice of percentages of conventionally employed fillers, tackifiers and plasticizers to create the body 10 as a compound in a form that on application of about 300° to 500° F. heat there is produced in the body 10 a controlled migration of the tackifiers and plasticizers to the body surface to render it fluidly adhesive while leaving the underlying portion of the body 10 stable though deformable under compression. This enables, in the practice of the invention, the utilization of the fact that with respect to the underlying portion of the body 10 a temporary loss of memory occurs on heating to the prescribed temperature range which on cooling in place returns and enables the body to adjust to the load contour and to be adhesively sealed to the load medium by reason of the differentially structured fluidly adhesive surface created on the heating. In the alternative, in forming the body 10 for use in the invention method it may be differentiated to provide that a surface layer of the material may be formed with less inert filler than the interior of the body 10 and by such means it may be provided that in the specified temperature range of about 300 to 500° F., the surface layer, which may be of only 1 to 5 mil. in thickness, will become fluidly adhesive while the interior of the body 10 will remain in essentially stable form, though capable of accommodating the load contour. Thus, the essence of the requirements of the coupling device for practice of the invention in a preferred utilization thereof are spelled out.

Turning now to the physical embodiment of the coupling device illustrated, in cross section the body 10 is shown to have a frusto-pyramidal shape, including a broad base 15 from which opposing sides 14 incline upwardly to a relatively narrow apex surface 16. Embedded interiorly of the strip 10, the length thereof, in this instance, is an electrical resistance wire 17. The latter may be integrated in the simple process of producing the body 10 per se. As seen, the wire 17 constitutes a core which is centrally positioned to be substantially equidistant between the base 15 and apex surface 16 and relatively equidistant from the sides 14 of the body 10. Whatever the length of the body, its core 17 is either projected from or suitably exposed adjacent its respective ends.

In the practice of the invention as illustrated, a strip 10 is used to fix a windshield 22 to the body 12 of an automobile 11. As seen in FIG. 1, at the front of the body 12 is an opening 13 adapted to accommodate the windshield. The strip used is either cut to length or preformed to seat coextensively with the automobile portion which rims the opening 13.

Figures 2, 3, 4, 5, 6:
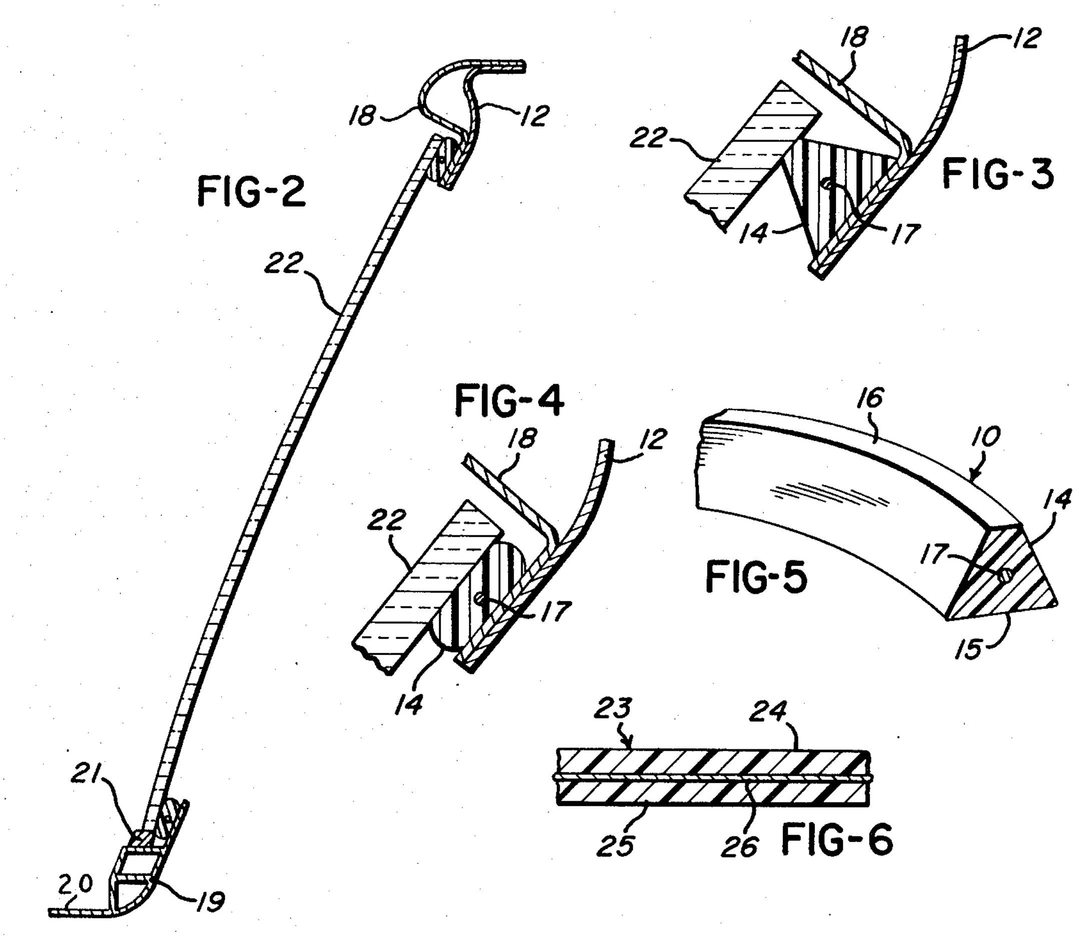
FIG. 2 is a fragmentary view, partly diagrammatic, taken on line 2—2 of FIG. 1.
FIG. 3 is a fragmentary cross-sectional view, enlarged with respect to FIG. 2, showing the windshield in place upon the utilized coupling device immediately prior to the resistance core of such device being energized.
FIG. 4 is a view like that of FIG. 3 taken after the resistance core has been energized.
FIG. 5 is an enlarged fragmentary view of a coupling device embodied in the illustration of FIGS. 1 through 4.
FIG. 6 is a fragmentary sectional view of a further coupling device.
Figure 7:
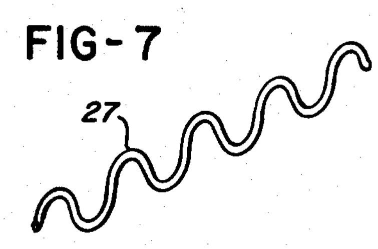

As seen in FIG. 2, the roof line of the body 12 terminates adjacent the upper run of the opening 13 in an angle bracket 18, the base of which provides a seat for the base 15 of the body 10 along the upper edge of the opening. Along the bottom and side portions of the opening an extension 19 of the cowl 20 similarly seats the base 15 of the strip 10. A projected abutment portion of the cowl 20 provides a block 21 for seating the base of the windshield in outwardly spaced relation from the cowl portion forming the base run of the opening 13.

The strip 10 is so applied to seat about the opening 13 as described so its respective end portions are positioned in relatively adjacent relation centrally of the bottom edge of the opening. The core ends **17*a* and 17*b*** are then exposed in side by side relation adjacent the ends of the strip.

Thus, in installing a windshield in accordance with the instant invention, a strip 10 is placed on the body 12 in a surmounting relation to the rim of opening 13 with the terminals of the core freely projecting as shown. The glass windshield 22 is then aligned with the opening and peripheral portions of its innermost surface are placed in contact with the apex portions of the strip 10 in a position of rest. The block means 21 forms a base to hold the glass so positioned. The parts at this time appear as shown in FIG. 3 of the drawings. At this point a source of electical power is connected to the terminals **17*a* and 17*b* of the strip core. This causes the core to heat, the heat being elevated, of course, to the aforementioned temperature in the range of about 300 to 500° F., which heat uniformly flows from the interior to the exterior surfaces of the strip 10**. By this means, the strip temperature is substantially equal at all its surfaces.

As a result of the heat so applied to a temperature within the range of from about 300 to 500° F. as before specified, the surfaces and only the surfaces of the strip 10 per se, which strip is preferably of butyl or ethylene-propylene rubber and characterized as previously described, become fluidly adhesive and the strip body plastically deforms under the pressure of the weight of the windshield per se. Due to the original shape of the strip 10, the body thereof deforms laterally so it tends to assume a configuration as shown in FIG. 4 of the drawings, the apex portion 16 achieving a broadened area of contact with the windshield 22.

As is obvious, a minimal effort is required to properly seat the windshield to the structure rimming the opening 13. The inherent definitive adhesive fluidity of the outer surfaces of the bonding strip 10, which is substantially uniform due to the interior source of the applied heat as here provided, and the load accommodating adjustment of the interior of the strip minimizes the pressure required to deform this strip and thereby seat the applied windshield in its proper position. This avoids any incidence of applied stress or strain which would produce cracking.

As a final step in this procedure, the flow of electrical current to the core 17 is discontinued and then the bonding strip is allowed to cool. On cooling of the strip body 10, the surface thereof inherently adheres and bonds tightly both to the glass windshield 22 and body structure and in such a manner as to provide a seal. There is no effort of note involved and no messy materials employed.

Particular note should be taken that the use of the simple invention embodiment and process inherently eliminates any moisture that might be present on the surface of the element which it bonds.

Thus, in using a coupling device in accordance with the instant invention it is accordingly positioned between elements to be bonded and heat is uniformly distributed from an interior core. The heat is, as expressed, of a value sufficient to raise the temperature of the device to a range from about 300 to 500° F., the precise temperature depending on the material and the application, to a degree properly to soften or cure, or both, in particular the adhesive compound being used for the body of the device. After proper temperature cycling, the heat source is removed and parts allowed to cool so a bond is completed and formed between the contacting parts.

Therefore, basically, in the preferred practice of the invention, it utilizes the inventive novel coupling device as above described, which device is the subject of applicant's co-pending application for U.S. Letters Patent Ser. No. 825,122, aforementioned. As noted, the device may take various form and may be utilized in various form depending on the application but it basically consists of a body of material having means in connection therewith capable of being caused to uniformly distribute heat through such material, which material is caused by the required heat to have the surface thereof differentially converted to a condition to form a bond to an adjacent contacting part. Of course, in the illustrated example, which is not limiting, the heat producing core is an electrically conductive element. Such element may be a simple wire as shown or a wire wound or impregnated core. It may even be a device lending reinforcing characteristics or even a foil tape. In the preferred embodiments the core is a wave formed wire, as will be further described. In any event, the heating core is embedded within the body of the bonding member and has portions thereof projected or accessible for connection to a heat source. It will be obvious that the body of the bonding element may take the form of a tape, sheet, cord, film or any mass contour, depending on the desired characteristics of the bond to be effected and the particular application.

The invention method provides advantages of speed, cleanliness and versatility in use and the ability to sealingly bond structures where mating contours are irregular. In the practice of the invention the bond is not produced by liquidizing a body but only its surface. The bond is therefoer more stable and leakproof than any heretofore created or available in accordance with the practices of the prior art. Further, using the invention method complex shapes may be readily bonded since in the use of material concepts such as provided in the stirp 10, the same is such to readily adapt itself to irregularities and varying shapes in a plastic deforming process which still does not affect its basic strength. Also, in utilizing an interior source of heat, a bond is produced with minimum heat distortion of the coupled elements. Note that in the illustration of the practice of the invention the electric resistance core is preferably retained as an integral part of the bonding means. Other corse may be so utilized. As is obvious, as a result of the practice of the invention as illustrated, the provision of the core in the coupling element employed may enable in some instances that the core serve as a reinforcement, preventing distortion of the coupling device during installation. In accordance with the inventive practice the core may also serve a further purpose in releasing the bond produced in parts by mechanical stripping or, more desirably, by reheating. A point of merit also lies in the fact the application of heat to the bonding members as described reduces surface tension of adhesive compounds of which it is formed, in most cases, to increase wetting ability of the compound. The need for primers is in most cases eliminated thereby. Moreover, temperature differences in the bonding element are eliminated since the core utilized is generally centrally positioned. Proper control of heat dissipation to the several bonding element surfaces is thereby achieved and compensation for ambient temperatures is possible by controlling the heat value.

While a specific application of the invention relating to installation of glass elements in automobiles is shown, the invention is, of course, in no sense limited to this application. Rather does the invention have wide and general application to the bonding together of parts. Also, as previously noted, the invention practice may utilize coupling devices which may assume forms other than that shown in FIGS. 1 through 5 of the drawings. It may, for example, assume a tape or sheet-like form as shown in FIG. 6. There, a device 23 is formed by embedding in intermediate layers 24 and 25 of a heat sensitive film material having interior and exterior surface body characteristics of the nature of the coupling member previously described, to form a permanent part thereof, a conductive foil material 26. The functions and manner of use of the device 23 are the same as those of the strip 10. Parts to be joined together are respectively brought into respective contacting relation with the upper and lower layers 24 and 25 of the device, following which an electrical current is then passed through the core 26 with a consequent softening or curing, or both, of the film portions 24 and 25. The surfaces of the layers 24 and 25, which are generally superposed, become fluidly adhesive, and, upon removal of the applied heat and subsequent cooling of the device and the parts between which it is interposed, such parts are joined together in a manner and by means forming a bond and constituting a seal.

As previously noted the preferred materials for fabricating coupling devices of a preferred nature to be employed in accordance with the invention have been found to be butyl and ethylene-propylene synthetic rubbers. When formed in the strip configuration they have been found readily adaptable to meet the requirements and terms of the present invention. Advantages may be considerably amplified for certain applications where the coupling members embody wave formed wire cores. The wave formed wire core appears to have particular significance in that it gives maximum flexibility to a strip section in all planes. Moreover, the configuration of the wave form core enables its optimum placement in relation to the surfaces of a strip element in accordance with the invention. The wave form enables a more complete and quicker distribution of the necessary heat to fluidize the surface of the strip. This of course will speed up the use of the strip in applications such as applying a windshield to an automotive vehicle. A further advantage of the wave form is that it avoids tendency of core wires such as used in prior art devices to melt out at sharp corners. In summary, the wave form increases heat radiation area, improves the characteristic of heat distribution and permits a greater range of section size and shape in reference to the strips employed.

Figure 8:
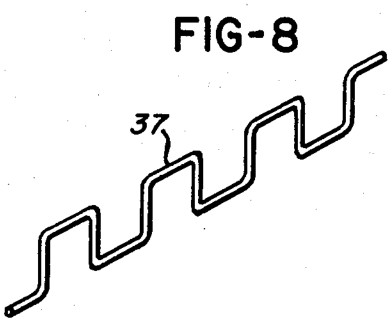

Attention is directed to FIGS. 7 through 11 of the drawings for variations in the wave form as contemplated by the present invention. Take particular note in FIG. 7, we have here a sine wave, the waves lying in a common plane. In FIG. 8, the wave form is rectangular, whereas in FIG. 9 it has a saw-tooth configuration. In each of the latter cases, the waves are again in a common plane. Each of these forms has excellent characteristics and results and may be variously used depending on the application. In any instance, they have definite advantages over the concept of a straight wire core which have been above enumerated. It should be patently clear that the efficiency of the heat radiation and distribution utilizing the wave formed wire is significantly greater than the single wire. Of course, the wave formed wire will be disposed in the core in a manner to most efficiently and quickly produce the fluidizing of the surface of the strip element so a windshield, for example, may be set and fixed in place in a minimum of time and with a minimum of effort.

Figures 9, 10, 10A, 11, 11A:
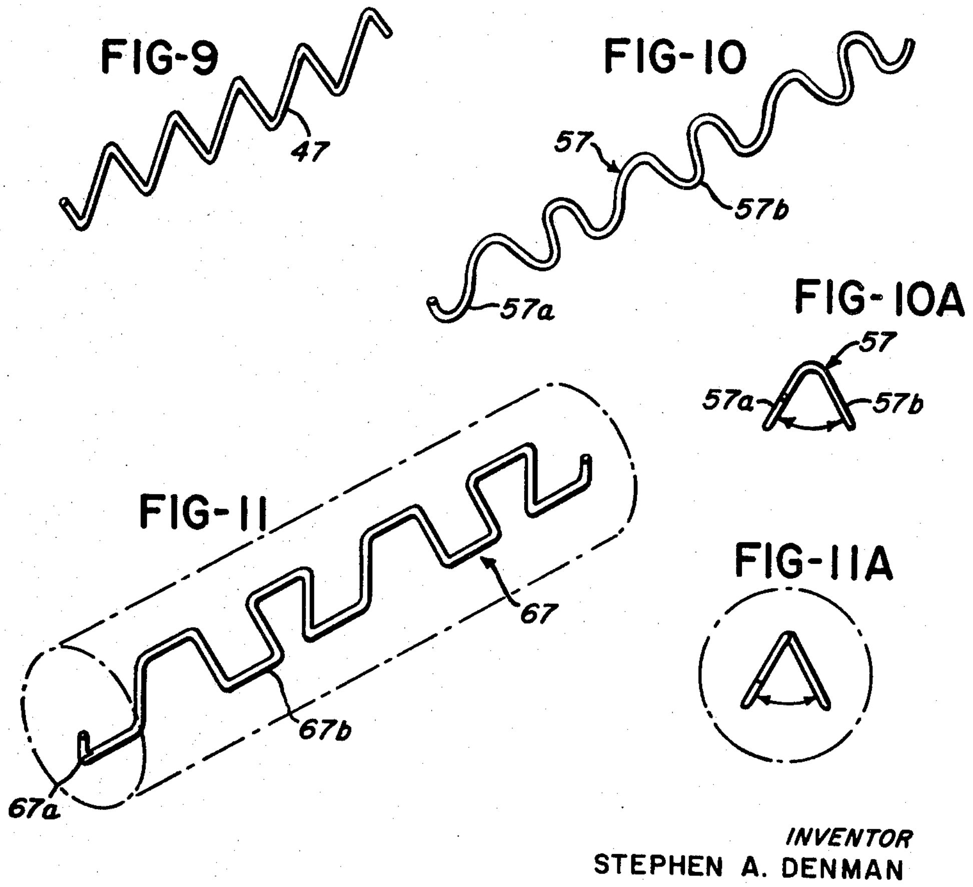

Take particular note of FIGS. 10 and 11 of the drawings. In the case of FIG. 10 we have a sine wave form of wire with successive wave portions being respectively offset (see FIG. 10A) into different planes. FIG. 11 shows the same concept as applied to the rectangular wave form wire. FIGS. 10A and 11A show the optimal orientation of the devices of FIGS. 10 and 11 in a thermo-plastic strip per the invention. In any event, the effectiveness and ability of invention embodiments to achieve the desired result is clearly advanced and enabled by the various formed wire elements to be used as core elements as here proposed.

There are also inherent unobvious advantages in using the wave formed wire in accordance with the invention. A strip can, for example, include a wave formed wire and be cut to length with no allowance for terminal end exposure of the wire. This is due to the fact that a wave formed wire core can be pulled out by stretching to produce the necessary terminal ends. Thus, a strip in accordance with the invention may introduce an extra cost saving factor where wave formed wires are employed as the core.

It is another unobvious advantage in application of the invention embodiments that in the case where the electrical resistance wire is employed, the same may be utilized to function as an antenna for a radio, for example. This is possible since the body of the invention strip inherently serves to insulate the wire from the surrounding structure.

In summary it will be seen from the foregoing that the use of the invention avoids the necessity of handling messy substantially liquid adhesive or sealing compounds and enables a self-locking of parts without the need for any degree of externally applied forces. As particularly applied to the setting of windshields as here illustrated, it will be clear that there will be substantial savings in labor and attendant costs as contrasted to the use of materials and practices as known in the prior art.

It will be self-evident from the foregoing that there is inherent in the invention as here disclosed a unique process of applying windshields, windows and the like to frames of dissimilar materials, in particular metal. Moreover, there is produced, by the application of the invention, considerably improved window and windshield units the composition of which affords a structure which has been improved to an unexpected degree.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect.

Having thus described my invention, I claim:

1. A method of bonding together parts, particularly parts of unlike material, comprising the steps of disposing a solid body of relatively stable plastically deformable material in contact with the respective parts to be bonded, said body being so structurally characterized that under conditions of selected high temperature surface portions only of said body will convert to a fluid adhesive form, and, with said body in contact with said parts, subjecting said body to heat by originating the heat interiorly thereof and flowing the same uniformly to the part contacting surface portions of said body, raising the temperature of said body to a level that only surface portions thereof become fluidly adhesive while maintaining interior portions in an essentially solid but load accommodating state, creating adhesive contact with said parts thereby and then cooling to form a solid bond and seal with and between said parts.

2. The method as set forth in claim 1 of bonding together parts characterized by effecting a generally uniform heating of said body to a degree only to render the interior thereof plastically deformable sufficient to equalize the adhesive contact areas of said body with the respective parts as the surface of said body is converted to a fluid adhesive form.

3. A method of bonding together parts as set forth in claim 1 characterized by applying said body in a strip form to dispose between opposed peripheral surface portions of the respective parts to be bonded whereby to produce in the bonding process a clean, protected seal between said parts.

4. A method of bonding parts as in claim 1 applied to creating a window, windshield or like installation wherein a glass or like segment is inserted in a frame characterized by applying said body to surmount the rim surface of said frame in strip form, superposing said glass segment to have portions contact and bear against said strip, and heating said body to said condition in which only surface portions thereof convert to a fluid adhesive form and to have the interior portion of said body plastically deform only to a degree to accommodate and conform to the applied load.

5. The method of creating a window, windshield or like unit as in claim 4 characterized by disposing said body in strip form to said frame and applying said glass segment to said strip form so that in initial application the strip is sandwiched between directly opposed face portions of said segment and said frame whereby to produce in the resulting unit a clean and protected seal.

6. A method of claim 1 applied to bonding a windshield or the like to a frame of different material comprising the steps of applying said body about said frame in a flexible compressible strip form so as to be essentially coextensive with said frame, placing the windshield or like element to have its peripheral portions seat over said strip and in opposed relation to said frame, applying heat to said strip through the medium of an interiorly positioned electrical resistance wire of a form to uniformly distribute through said strip the resultant heat, the heat being applied in a manner to render only the surface of said strip fluidly adhesive to produce an adhesive contact between the frame and the strip and the windshield or like element and the strip, the parts being bonded together by cooling in place under normal atmospheric conditions.

7. A method of bonding together parts, particularly parts of unlike materials, including the steps of providing a body of plastically deformable material in which the material is prepared and combined to produce in the body under internally applied heat a fluidly adhesive outer surface and within said outer surface a condition thereof wherein it is plastically deformable only to a degree to accommodate and conform to an applied load, positioning said body between and in contact with parts to be bonded, and in succeeding steps internally heating said body and discontinuing the application of such heat to achieve a strong bond and seal between said parts.

8. A method according to claim 7, wherein the material of said body is a thermo-plastic mix including selected percentages of fillers, tackifiers and plasticizers creating a compound in which under internally applied heat there is produced a controlled migration of the tackifiers and plasticizers to the body surface to render it fluidly adhesive while leaving underlying portions of the body stable though deformable under compression.

9. A method according to claim 7, wherein the material of said body includes inert filler material, a surface layer of the body being formed with less filler material than the body interior so as to convert more readily to a fluid-like consistency under applied heat.

References Cited

UNITED STATES PATENTS

| | | | |
|---|---|---|---|
| 3,574,024 | 4/1971 | Rose | 156—108 |
| 3,263,268 | 8/1966 | Flaherty | 156—275 X |

HAROLD ANSHER, Primary Examiner

U.S. Cl. X.R.

156—275, 293, 380

UNITED STATES PATENT OFFICE
CERTIFICATE OF CORRECTION

Patent No. 3,756,881 Dated September 4, 1973

Inventor(s) Stephen A. Denman

It is certified that error appears in the above-identified patent and that said Letters Patent are hereby corrected as shown below:

Col. 2, line 15, "forecd" is corrected to read -- forced --.

Col. 3, line 9, "particles" is corrected to read -- practices --.

Col. 4, line 73, "and" (1st occurrence) is corrected to read -- hand --.

Col. 7, line 15, "therefoer" is corrected to read -- therefore --;
line 19, "stirp" is corrected to read -- strip --;
line 27, "corse" is corrected to read -- cores --.

Signed and sealed this 12th day of March 1974.

(SEAL)
Attest:

EDWARD M.FLETCHER,JR.
Attesting Officer

C. MARSHALL DANN
Commissioner of Patents